(12) United States Patent
Na et al.

(10) Patent No.: US 8,032,184 B2
(45) Date of Patent: Oct. 4, 2011

(54) METHOD FOR GENERATING DOWNLINK BEAMFORMING WEIGHTING VECTORS

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 850 days.

(21) Appl. No.: 12/035,041

(22) Filed: Feb. 21, 2008

(65) Prior Publication Data

US 2008/0207270 A1      Aug. 28, 2008

Related U.S. Application Data

(60) Provisional application No. 60/902,693, filed on Feb. 22, 2007.

(51) Int. Cl.
*H04M 1/00* (2006.01)
*H04B 7/208* (2006.01)
*H04Q 11/00* (2006.01)
*H04J 11/00* (2006.01)

(52) U.S. Cl. .............. 455/562.1; 370/344; 370/383; 370/260; 370/210

(58) Field of Classification Search .............. 455/562.1; 370/344, 383, 260, 210
See application file for complete search history.

(56) References Cited

U.S. PATENT DOCUMENTS

| 6,345,188 | B1* | 2/2002 | Keskitalo et al. | 455/561 |
| 2002/0105928 | A1* | 8/2002 | Kapoor et al. | 370/334 |
| 2004/0071222 | A1* | 4/2004 | Liang et al. | 375/267 |
| 2004/0178954 | A1* | 9/2004 | Vook et al. | 342/383 |
| 2006/0281494 | A1* | 12/2006 | Wilson et al. | 455/562.1 |

FOREIGN PATENT DOCUMENTS

| EP | 1515394 A2 | 3/2005 |
| GB | 2349045 A | 10/2000 |
| WO | 0027148 A1 | 5/2000 |

OTHER PUBLICATIONS

International Search Report and Written Opinion dated Jun. 26, 2008 in PCT/US08/054547.

* cited by examiner

*Primary Examiner* — George Eng
*Assistant Examiner* — Muthuswamy Manoharan
(74) *Attorney, Agent, or Firm* — Edell, Shapiro & Finnan, LLC

(57) ABSTRACT

Techniques are provided for generating downlink beamforming weighting vectors by using channel information about one or more uplink sub-channels in a wireless communications network in the case of frequency mismatch between downlink channels and uplink channels for a specific user. The method comprises calculating an average channel covariance matrix of one or more uplink sub-channels assigned to a specific user, dividing a sector of a cell into a plurality of sub-sectors, transforming the average channel covariance matrix into a plurality of average sub-sector channel covariance matrices and obtaining an average uplink beamforming weighting vector group corresponding to the plurality of sub-sectors, selecting direction of arrival (DOA) sub-sectors from the plurality of sub-sectors by using the plurality of average sub-sector channel covariance matrices, and computing a time delay sequence for the DOA sub-sectors, and generating downlink beamforming weighting vectors by using the average uplink beamforming weighting vectors corresponding to the DOA sub-sectors and the information derived from the time delay sequence.

26 Claims, 3 Drawing Sheets

METHOD FOR GENERATING DOWNLINK BEAMFORMING WEIGHTING VECTORS

CROSS REFERENCE TO RELATED APPLICATIONS

The present application claims the benefit of U.S. Provisional Application Ser. 60/902,693, which was filed on Feb. 22, 2007, the entire contents of which is hereby incorporated by reference.

BACKGROUND

Data are transmitted via a broadband channel in broadband wireless communications networks employing multiple access methods such as time division duplex (TDD) Code Division Multiple Access (CDMA) and TDD Orthogonal Frequency Division Multiple Access (OFDMA). A broadband channel can be divided into a plurality of sub-channels, each of which comprises a frequency band with distinct channel characteristics.

In a TDD CDMA or OFDMA network, the channel characteristics of downlink channels may be different from those of uplink channels. One of the reasons is that downlink channels and uplink channels are assigned in different frequency bands for a specific user. Another reason is that there is frequency mismatch between downlink channels and uplink channels. As a result, a base transceiver station (BTS) has no means to retrieve downlink channel information from messages transmitted via uplink channels. More specifically, it is difficult for a BTS to generate downlink beamforming weighting vectors for downlink channels without explicitly receiving channel information about the downlink channels. However, it is undesirable for a BTS to explicitly send channel information about downlink channels as the transmission of channel information consumes bandwidth. Therefore, it is crucial for a wireless communications network to be able to employ a method that can generate downlink beamforming weighting vectors in the case of frequency mismatch between downlink channels and uplink channels for a specific user.

In a TDD network, an uplink channel coefficient matrix is strongly correlated with a downlink channel coefficient matrix. Therefore, an uplink channel coefficient matrix can be transformed into a downlink channel coefficient matrix using the correlation between the two matrices. Specifically, downlink beamforming weighting vectors can be generated by using the uplink channel coefficient matrix.

DETAILED DESCRIPTION

The following detailed description refers to the accompanying drawings. The description includes non-limiting examples of embodiments.

Overview

Disclosed herein is a method for generating downlink beamforming weighting vectors by using channel information about one or more uplink sub-channels in a wireless communications network. The method involves calculating an average channel covariance matrix of one or more up link sub-channels assigned to a specific user. A sector of a cell is divided into multiple sub-sectors. The average channel covariance matrix is transformed into a plurality of average sub-sector channel covariance matrices in order to produce an average uplink beamforming weighting vector group corresponding to the plurality of sub-sectors. Direction of arrival (DOA) sub-sectors are selected from the plurality of sub-sectors by using the plurality of average sub-sector channel covariance matrices, and a time delay sequence for the DOA sub-sectors is computed. The downlink beamforming weighting vectors are generated by using the average uplink beamforming weighting vectors corresponding to the DOA sub-sectors and the information derived from the time delay sequence.

The disclosed method is computationally simple and it is not affected by multi-path interference. The method is applicable to wireless communications networks in which downlink and uplink sub-channels are assigned to different frequency bands. For example, the network may be one that employs time division duplex (TDD) Orthogonal Frequency Division Multiple Access (OFDMA).

Figure 1:
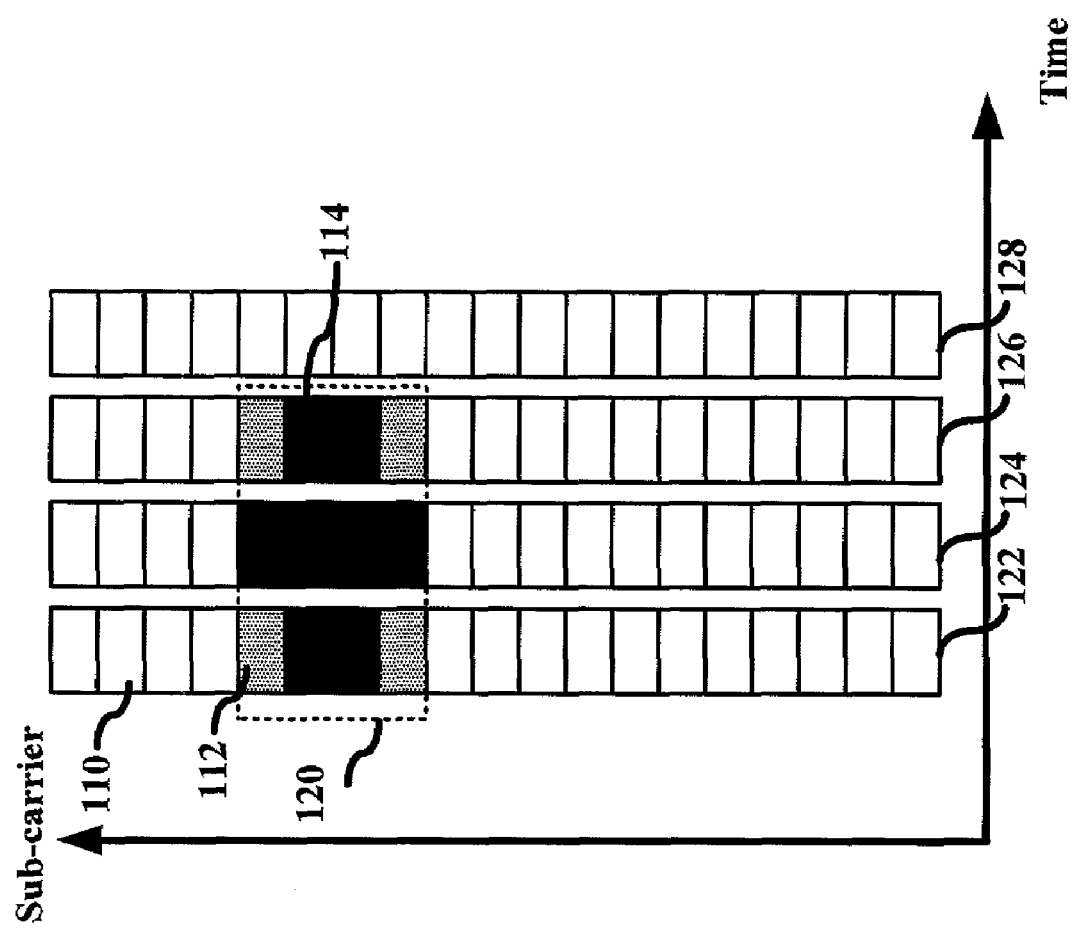
FIG. 1 illustrates a tile defined in a time-and-frequency domain.

A broadband uplink channel comprises a plurality of sub-carriers. An uplink signal is transmitted in a tile comprising a number of subcarriers over several time instances. A tile, as illustrated in FIG. 1, is a block defined in a time-and-frequency domain. For example, in IEEE 802.16e specification, a tile 120 in an uplink sub-channel consists of four subcarriers 110 over three symbols, and each symbol (122, 124, and 126) is transmitted at one time instance. Subcarriers 112 (shaded) carry pilot signal and subcarriers 114 (black) carry data. A user is assigned one or more uplink sub-channels, each of which includes six tiles. The disclosed method is applied to every user in a wireless communications network.

Figure 2:
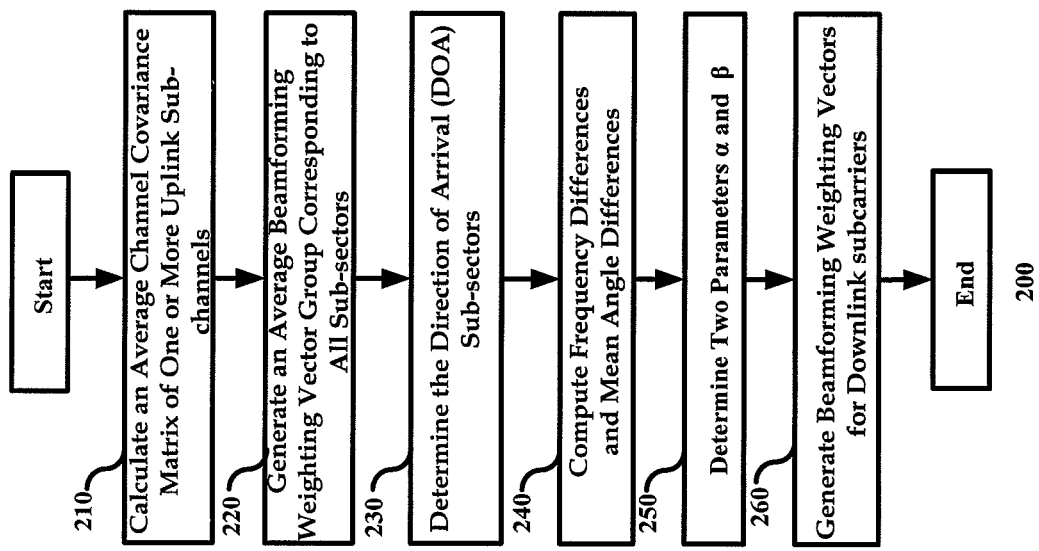
FIG. 2 is an example of a flow diagram illustrating a method for generating downlink beamforming weighting vectors.

FIG. 2 is a flow diagram illustrating a method for generating downlink beamforming weighting vectors in accordance with one embodiment. The method includes the following steps: calculate an average channel covariance matrix of one or more uplink sub-channels assigned to a user (210), generate an average beamforming weighting vector group corresponding to all sub-sectors (220), determine the direction of arrival (DOA) sub-sectors of uplink signals (230), compute the frequency difference and mean angle difference between a reference tile and each of the remaining tiles (240), determine two parameters (250), and generate beamforming weighting vectors for a downlink subcarrier (260). Each step is described in detail below.

Step 210 starts with the calculation of an instantaneous channel covariance matrix. Let M be the number of antennas on a BTS and $S_{j,q}(m)$ denote received frequency domain signals of the j-th band of the q-th symbol from the m-th antenna, where $1 \leq m \leq M$. Note that $S_{j,q}(m)$ is a scalar.

An instantaneous channel covariance matrix of subcarrier i in tile n is denoted as $R_{i_n}$, and it is defined by the following equation:

$$R_{i_n} = \frac{1}{12} \sum \begin{bmatrix} S_{j,q}(1) \\ S_{j,q}(2) \\ \vdots \\ S_{j,q}(M) \end{bmatrix} \begin{bmatrix} S_{j,q}(1) \\ S_{j,q}(2) \\ \vdots \\ S_{j,q}(M) \end{bmatrix}^H,$$

where H is a Hermitian operator; M is the number of antennas on a BTS; and $i_1, i_2, \ldots, i_J$ are indices of frequency bands. Let the size of Fast Fourier Transform (FFT) be L, where $1 \leq i_1 \leq i_2 < \ldots \leq i \leq L$. The calculation of an instantaneous channel covariance matrix is performed for all subcarriers in the tiles of the one or more sub-channels assigned to a specific user.

Specifically, $\{R_{i_n}\}_{n=1}^J$ denotes a group of instantaneous channel covariance matrices of subcarrier i, corresponding to a specific user, where J is the number of tiles assigned to the user, is completed.

For every instantaneous channel covariance matrix $R_{i_n}$, a principle eigenvector $U_{i_n}$ (a column vector) and a maximum eigenvalue $\lambda_{i_n}$ are obtained by using singular value decomposition (SVD). Then, a channel covariance matrix of subcarrier i in tile n, denoted as $\hat{R}_{i_n}$, is generated using $U_{i_n}$ and $\lambda_{i_n}$, and it is defined by any of the following equations: $\hat{R}_{i_n} = U_{i_n}(U_{i_n})^H$, $\hat{R}_{i_n} = |\lambda_{i_n}| U_{i_n}(U_{i_n})^H$, or $\hat{R}_{i_n} = |\lambda_{i_n}|^2 U_{i_n}(U_{i_n})^H$. Next, an average channel covariance matrix $\overline{R}$ of all tiles of one or more sub-channels assigned to a specific user is obtained by summing the channel covariance matrices' of all tiles and it is defined by the following equation:

$$\overline{R} = \sum_{n=1}^{J} \hat{R}_{i_n},$$

where $\hat{R}_{i_n}$ is a channel covariance matrix.

In step 220, a cell in a wireless communications network is divided into one or more sectors, and each sector is further divided into a predetermined number ($N_s$) of sub-sectors. Next, a sub-sector channel covariance matrix of subcarrier i in tile n is obtained for each sub-sector z, and it is defined by the following equation: $\hat{R}_{i_{n,z}} = \hat{R}_{i_n} T_z$, where $T_z$ is a predetermined transformation matrix of sub-sector z; and $1 \leq z \leq N$. The transformation matrix $T_z$ is defined by $T_z = (\tilde{Q}_{UL}^H \tilde{Q}_{UL})^{-1} \tilde{Q}_{UL}^H B_i Q_{UL,i}$, where $Q_{UL}(\theta)$ is an uplink array response matrix. The uplink array response matrix, $Q_{UL}(\theta)$ is calculated according to the following equation: $Q_{UL}(\theta) = A(\theta, \lambda_{UL}) A^H(\theta, \lambda_{UL})$, where $\lambda$ is the wavelength of an uplink subcarrier, $A(\theta, \lambda_{UL})$ is an uplink array steering vector for the DOA, denoted as $\theta$.

The matrix $\tilde{Q}_{UL}$ is a whole range uplink matrix and the matrix $\tilde{Q}_{UL,i}$ is a partial range uplink matrix. The matrix $\tilde{Q}_{UL}$ is defined by $$\tilde{Q}_{UL} = \begin{bmatrix} Q_{UL}(\theta_1) \\ Q_{UL}(\Delta + \theta_1) \\ \vdots \\ Q_{UL}((N_a - 1)\Delta + \theta_1) \end{bmatrix}$$

where $N_a$ is the total number of angles, and $$\Delta = \frac{\theta_{N+1} - \theta_1}{N_a - 1}$$

is the step of angles.

The matrices $\tilde{Q}_{UL,1}$ and $\tilde{Q}_{UL,i}$ are defined by $$\tilde{Q}_{UL,1} = \begin{bmatrix} Q_{UL}(\theta_1) \\ Q_{UL}(\Delta + \theta_1) \\ \vdots \\ Q_{UL}\left(\frac{(N_a - 1)\Delta}{N_s} + \theta_1\right) \end{bmatrix} \text{ and }$$

$$\tilde{Q}_{UL,i} = \begin{bmatrix} Q_{UL}(\theta_i) \\ Q_{UL}(\Delta + \theta_i) \\ \vdots \\ Q_{UL}\left(\frac{(N_a - 1)\Delta}{N_s} - \Delta + \theta_i\right) \end{bmatrix},$$

for i>1, where $\theta_1$ is the initial value of angle (the direction of one edge of sector), $$\theta_i = \theta_1 + (i - 1)\frac{(N_a - 1)\Delta}{N_s} + \Delta,$$

and $N_s$ is the number of sub-sectors.

The parameter $B_i$ is defined as:

$$B_i = \begin{bmatrix} 0_{(M(a+\text{sign}(i-1))) \times \left(\frac{(N_a-1)M}{N_s}\right)} \\ I_{\left(\frac{(N_a-1)M}{N_s}\right) \times \left(\frac{(N_a-1)M}{N_s}\right)} \\ 0_{(Mb) \times \left(\frac{(N_a-1)M}{N_s}\right)} \end{bmatrix}$$

where I is identity matrix and 0 is zero matrix. If i=1, then a=0 and $$b = (N_s - 1)\frac{(N_a - 1)}{N_s}.$$

If i>1, then $$a = (i - 1)\frac{(N_a - 1)}{N_s} \text{ and } b = (N_s - i)\frac{(N_a - 1)}{N_s}.$$

A beamforming weighting vector group for subcarrier i in tile n of all sub-sectors is denoted as $\{U_{i_n,1}, U_{i_n,2}, \ldots, U_{i_n,N_s}\}$, where $U_{i_n,z}$ is the first row vector of a sub-sector channel covariance matrix of sub-sector z, denoted as $\hat{R}_{i_{n,z}}$. An average sub-sector channel covariance matrix $\overline{R}_z$ is obtained based on the following equation: $\overline{R}_z = \overline{R} T_z$, where $\overline{R}$ is an average channel covariance matrix; $T_z$ is a predetermined transformation matrix of sub-sector z; and $1 \leq z \leq N_s$. An average beamforming weighting vector group corresponding to all sub-sectors is thus generated and it is denoted as $\{\overline{U}_1, \overline{U}_2, \ldots \overline{U}_{N_s}\}$, where $\overline{U}_z$ is the first row vector of an average sub-sector channel covariance matrix $\overline{R}_z$.

Step 230 starts with calculating the trace (i.e., the sum of diagonal elements) of each sub-sector by using the average sub-sector channel covariance matrix $\overline{R}_z$. Then the absolute values of the traces of all sub-sectors are used to form an energy array $\{C_1, C_2, \ldots, C_{N_s}\}$, where $C_j$ is the absolute value of the trace of sub-sector j. Next, a predetermined rule is applied to select K $C_j$'s from the energy array $\{C_1, C_2, \ldots, C_{N_s}\}$. These K $C_j$'s are sorted to form a DOA energy array $\{C_{j_1}, C_{j_2}, \ldots C_{j_K}\}$, where j is the index of a sub-sector; $1 \leq j \leq N_s$; and $C_{j_1} \geq C_{j_2}, \ldots C_{j_K}$. The sub-sectors included in the DOA energy array are designated as DOA sub-sectors.

In one embodiment, the predetermined rule requires that $C_j$ be included in the DOA energy array if $$C_j \geq f_1 \frac{1}{N_s} \sum_{n=1}^{N_s} C_n,$$

where $f_1$ is a positive constant parameter (e.g., $f_1=0.1$). Let $C_{j_{max}} = C_{j_1}$, where $j_{max}$ is the index of the DOA sub-sector with the largest trace.

Step 240 begins with selecting a subcarrier in a tile as the reference subcarrier for each of the sub-sectors in the DOA energy array. The tile including the reference subcarrier is the reference tile. Then, the frequency of the reference subcarrier is chosen as the reference frequency. Next, the frequency difference and mean angle difference between the reference tile and each of the remaining tiles are calculated. In one embodiment, the frequency of the first subcarrier in the first tile is chosen as the reference frequency. The frequency difference between the reference tile and each of the remaining tiles is computed using the following equation: $B(n-1)=i_n-i_1$, where $i_n$ is the frequency of a subcarrier in tile n; $i_1$ is the reference frequency of tile 1; and $2 \leq n \leq J$.

In addition, a mean angle difference between the reference tile and each of the remaining tiles in DOA energy array is computed based on the following equation: $\phi(n-1,k) = \text{mean}(\text{angle}((U_{i_n,j_{max}}./U_{i_n,j_k})./(U_{i_1,j_{max}}./U_{i_1,j_k})))$, where ./ represents the vector division operator; angle(.) returns the value of a phase; mean(.) returns the mean value of a phase; $2 \leq n \leq J$; and $2 \leq k \leq K$.

In step 250, two parameters, $\alpha$ and $\beta$ are determined. A predetermined range vector $A_{range}=[A, \ldots, B]$, where A and B are integers, is computed according to the maximum multipath delay. The range vector defines the range of a phase. In one embodiment, A=−5 and B=15. In another embodiment, A=−15 and B=15. An angle between two sub-sectors, denoted as $S_{angle}(k,:)$, represents a time delay sequence of these sub-sectors, which is calculated using a grid search method and is defined by the following equation:

$$S_{angle}(k,:) = \sum_{i=1}^{J-1} |\text{angle}(\exp(-\sqrt{-1} * (2\pi * B(i) * A_{range}/L + \phi(i,k))))|,$$

where k is the index of DOA sub-sector; B(i) is a frequency difference between a reference frequency and a subcarrier in tile i; L is the size of FFT; and $\phi(i,k)$ is a mean angle difference.

After the minimum value of the time delay sequence vector $S_{angle}(k,:)$ and the sub-sectors k are identified, the two parameters are obtained based on the following equations: $\beta(k)=S_{angle}(k,\tau_{min})$, where $\tau_{min}$ is the index of the minimum value of $S_{angle}(k,:)$, and $\alpha(k)=A_{range}(\tau_{min})$.

Step 260 starts with initializing a beamforming weighting vector of a downlink subcarrier. Initialization can be performed in a number of ways. In one embodiment, a beamforming weighting vector for a downlink subcarrier, denoted as U, is initialized according to the following equation: $U_y = U_{i_{close},j_{max}}$, where $U_{i_{close},j_{max}}$ is a beamforming weighting vector for an uplink subcarrier $i_{close}$ of the DOA sub-sector $j_{max}$ and $i_{close}$ is the index of a subcarrier whose frequency is closest to that of subcarrier y.

A threshold value $f_2$ is chosen based on the received SNR of each antenna on the BTS. For example, if the received SNR of each antenna is $\leq 0$ dB, then $$f_2 = \frac{2}{3}J,$$

where J is the number of tiles designated to a specific user. If the received SNR of each antenna is >0 dB, then $f_2 = \infty$.

For each of the remaining K−1 DOA sub-sectors, k, where $2 \leq k \leq K$, the beamforming weighting vector $U_y$ for downlink subcarrier y is updated according to the following equation: $U_y = U_y + U_{i_{close},j_k} \exp(\sqrt{-1}*2\pi*(y-i_{close})*\alpha(k)/L)$ if $\beta(k) < f_2$; otherwise, $U_y$ is not updated.

After all DOA sub-sectors are considered, $U_y$ is normalized to generate the beamforming weighting vector for the downlink subcarrier y, $$U_y = \frac{\text{conjugate}(U_y)}{\text{norm}(U_y)},$$

where conjugate(.) is the conjugate operator and the norm(.) is the Euclidean norm operator.

In another embodiment, calculating the beamforming weighting vector $U_y$ for downlink subcarrier y is achieved by initializing $U_y$ according to the following equation: $U_y = \text{abs}(\overline{U}_{j_{max}})*\exp(\sqrt{-1}*\text{angle}(U_{i_{close},j_{max}}))$, where abs(.) is the absolute value operator. The beamforming weighting vector calculated using the above equation achieves better throughput when the received SNR is less than 0 dB.

For each of the remaining K−1 DOA sub-sectors, k, where $2 \leq k \leq K$, if $\beta(k) \leq f_2$, the beamforming weighting vector $U_y$ of downlink subcarrier y is updated according to the following equation: $U_y = U_y + \text{abs}(\overline{U}_{j_k})*\exp(\sqrt{-1}*\text{angle}(U_{i_{close},j_k}\exp(\sqrt{-1}*2\pi(y-i_{close})\alpha(k)/L)))$. Otherwise, $U_y$ is not updated.

After all DOA sub-sectors are considered, $U_y$ is normalized to generate the beamforming weighting vector for downlink subcarrier y, $$U_y = \frac{\text{conjugate}(U_y)}{\text{norm}(U_y)},$$

where conjugate(.) is the conjugate operator and the norm(.) is the Euclidean norm operator.

Figure 3:
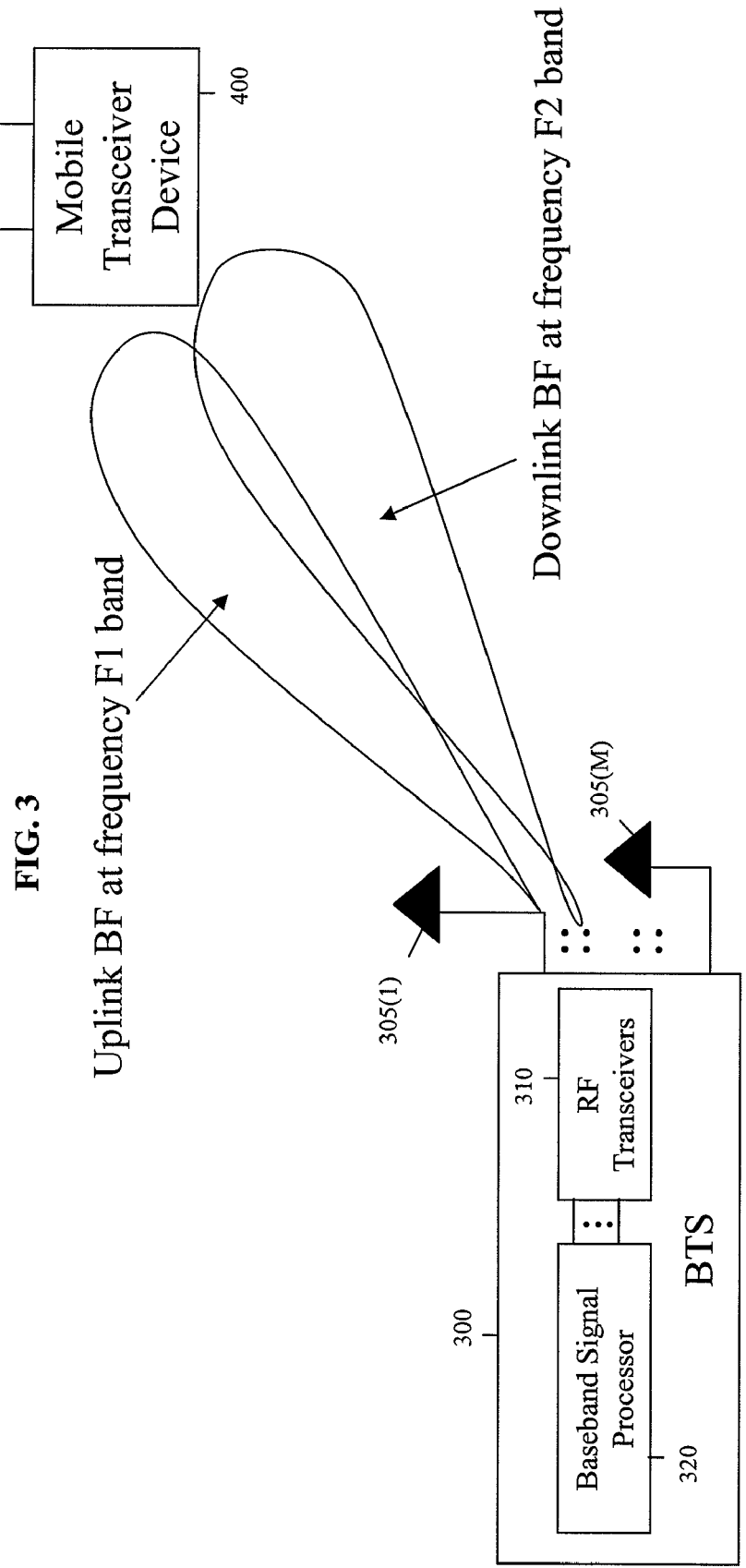
FIG. 3 is a block diagram of a BTS communicating with a mobile transceiver device using the techniques shown in FIG. 2.

FIG. 3 illustrates a wireless communication network comprising a BTS 300 and a mobile wireless transceiver device 400. A single mobile wireless transceiver device 400 is shown for simplicity but it should be understood that typically there are a plurality of mobile wireless transceiver devices that communicate with the BTS 300. In general, the mobile wireless transceiver device 400 is any destination device (i.e., "user") to which the BTS 300 transmits signals.

FIG. 3 also shows an example of a simple block diagram of the BTS 300 as comprising an RF transceivers block 310 and a baseband signal processing block 320. The RF transceivers block 310 receives RF signals transmitted to the BTS 300 from mobile wireless transceiver devices, e.g., device 400, that are detected by antennas 305(1)-305(M), and downconverts those signals to baseband signals. Likewise, the RF transceivers block 310 upconverts baseband transmit signals for transmission by the antennas 305(1)-305(M). The baseband signal processing block 320 performs the baseband modulation and formatted associated with the particular modulation scheme employed, and also performs the method depicted in FIG. 2 for generating downlink beamforming weighting vectors. The baseband signal processing block 320 may be implemented by logic encoded in one or more tangible media (e.g., embedded logic such as an application specific IC, digital signal processor instructions, software that is executed by a processor, etc.).

The foregoing provides many different embodiments for implementing different features of the system and method described herein. Specific examples of components and processes are merely examples and are not intended to be limiting.

What is claimed is:

1. A method comprising:
    receiving uplink signals from a mobile device in a wireless communication network at a plurality of antennas of a base station device;
    calculating an average channel covariance matrix of one or more uplink sub-channels assigned to the mobile device;
    dividing a sector of a cell of the wireless communication network into a plurality of sub-sectors;
    transforming the average channel covariance matrix into a plurality of average sub-sector channel covariance matrices and computing therefrom an average uplink beamforming weighting vector group corresponding to the plurality of sub-sectors;
    selecting direction of arrival (DOA) sub-sectors from the plurality of sub-sectors using the plurality of average sub-sector channel covariance matrices;
    computing a time delay sequence for the DOA sub-sectors; and
    generating downlink beamforming weighting vectors using the average uplink beamforming weighting vectors corresponding to the DOA sub-sectors and information derived from the time delay sequence.

2. The method of claim 1, wherein calculating the average channel covariance matrix further comprises:
    computing instantaneous channel covariance matrices of a plurality of subcarriers of the one or more uplink sub-channels comprising a plurality of tiles, each of which includes a plurality of subcarriers over more than one time instance;
    generating channel covariance matrices of the plurality of subcarriers from the instantaneous channel covariance matrices; and
    obtaining the average channel covariance matrix of the one or more sub-channels assigned to the mobile device from channel covariance matrices of the plurality of subcarriers.

3. The method of claim 2, wherein computing the instantaneous channel covariance matrix comprises computing $$R_{i_n} = \frac{1}{12} \sum \begin{bmatrix} S_{j,q}(1) \\ S_{j,q}(2) \\ \vdots \\ S_{j,q}(M) \end{bmatrix} \begin{bmatrix} S_{j,q}(1) \\ S_{j,q}(2) \\ \vdots \\ S_{j,q}(M) \end{bmatrix}^H,$$

where H is a Hermitian operator; M is the number of antennas of the base station device; $i_1, i_2 \ldots, i_j$ are indices of frequency bands; and $S_{j,q}(m)$ denotes received frequency domain signals of the j-th band of the q-th symbol from the m-th antenna, where $1 \leq m \leq M$.

4. The method of claim 2, wherein generating a channel covariance matrix of subcarrier i in tile n, denoted as $\hat{R}_{i_n}$, is generated based on either $\hat{R}_{i_n} = U_{i_n}(U_{i_n})^H$, $\hat{R}_{i_n} = |\lambda_{i_n}| U_{i_n}(U_{i_n})^H$ or $\hat{R}_{i_n} = |\lambda_{i_n}|^2 U_{i_n}(U_{i_n})^H$ where H is a Hermitian operator, wherein $U_{i_n}$ is a principle eigenvector and $\lambda_{i_n}$ a maximum eigenvalue of the instantaneous channel covariance matrix $R_{i_n}$.

5. The method of claim 2, and further comprising computing the average channel covariance matrix by summing the channel covariance matrices of all tiles based on the following equation:

$$\overline{R} = \sum_{n=1}^{J} \hat{R}_{i_n},$$

where $\hat{R}_{i_n}$ is a channel covariance matrix of subcarrier i in tile n.

6. The method of claim 1, and further comprising computing the average sub-sector channel covariance matrix $\overline{R}_z$ for sub-sector z based on the following equation: $\overline{R}_z = \overline{R}T_z$, where $T_z$ is a predetermined transformation matrix of sub-sector z; $1 \leq z \leq N_s$ where $N_s$ is the number of sub-sectors and $\overline{R}$ is the average channel covariance matrix.

7. The method of claim 1, wherein computing the average uplink beamforming weighting vector group corresponding to the plurality of sub-sectors comprises computing $\{\overline{U}_1, \overline{U}_2, \ldots, \overline{U}_z\}$, where $\overline{U}_z$ is the first row vector of R the average sub-sector channel covariance matrix $\overline{R}_z$.

8. The method of claim 1, wherein selecting the DOA sub-sectors further comprises:
    calculating traces of the plurality of sub-sectors using the average sub-sector channel covariance matrices;
    forming an energy array $\{C_1, C_2 \ldots, C_{N_s}\}$, where $C_j$ is the absolute value of the trace of sub-sector j; and
    determining DOA sub-sectors to form a DOA energy array.

9. The method of claim 8, where determining DOA sub-sectors comprises determining that a sector is to be included in the DOA energy array if $$C_j \geq f_1 \frac{1}{N_s} \sum_{n=1}^{N_s} C_n,$$

where $f_1$ is a positive constant parameter.

10. The method of claim 9, wherein $f_1$ equals to 0.1.

11. The method of claim 1, wherein computing the time delay sequence comprises using a grid search method according to the following equation:

$$S_{angle}(k, :) = \sum_{i=1}^{J-1} \left| \text{angle}\left(\exp\left(-\sqrt{-1} * (2\pi * B(i) * A_{range} / L + \phi(i, k))\right)\right) \right|,$$

where k is the index of DOA sub-sector; B(i) is a frequency difference between a reference subcarrier and a subcarrier in tile i; J is the number of tiles; angle (.) is an operator returning a phase angle; and φ(i,k) is a mean angle difference and $A_{range}$ is a predetermined range vector $A_{range} = [A, \ldots, B]$, where A and B are integers.

12. The method of claim 11, and further comprising selecting the frequency of the reference subcarrier in a tile as the reference frequency of a DOA sub-sector and the tile is designated as the reference tile.

13. The method of claim 12, wherein selecting the frequency comprises selecting the frequency of the first subcarrier in the first tile as the reference frequency.

14. The method of claim 11, and further comprising computing the mean angle difference between the reference tile and each of the remaining tiles in the DOA energy array based on the following equation: $\phi(n-1,k)=\text{mean}(\text{angle}(U_{i_n,j\ max}/U_{i_1,j\ max})/(U_{i_1,j\ max}/U_{i_1,j_k})))$, where $2\leq n\leq J$; $2\leq k\leq K$, ./represents the vector division operator; angle (.) returns the value of a phase; mean(.) returns the mean value of a phases; and $U_{i_n,z}$ is a beamforming weighting vector of subcarrier i in tile n of sub-sector z.

15. The method of claim 1, wherein generating the downlink beamforming weighting vectors further comprises:
   determining $\beta(k)$ in according with the following equation: $\beta(k)=S_{angle}(k,\sigma_{min})$, and $\sigma_{min}$ is the index of the minimum value of $S_{angle}(k,:)$, wherein $S_{angle}(k,:)$ represents an angle between two sub-sectors;
   obtaining $\alpha(k)$ by using the following equation: $\alpha(k)=A_{range}(\sigma_{min})$, where $A_{range}(.)$ is a predetermined range vector, $A_{range}=[A, \ldots, B]$, where A and B are integers; and
   computing a beamforming weighting vector $U_y$ for each downlink subcarrier y from $\alpha(k)$ and $\beta(k)$.

16. The method of claim 15, wherein computing the beamforming weighting vector further comprises:
   initializing a beamforming weighting vector for a downlink subcarrier $U_y$ according to the following equation: $U_y=U_{i_{close},j_{max}}$, where $U_{i_{close},j_{max}}$ is a beamforming weighting vector for an uplink subcarrier $i_{close}$ of the DOA sub-sector $j_{max}$ and $i_{close}$ the index of a subcarrier whose frequency is closest to that of subcarrier y;
   updating the beamforming weighting vector for the downlink subcarrier $U_y$ by taking into account all DOA sub-sectors in according with the following equation: $U_y=U_y+U_{i_{close},j_k}\ \exp(\sqrt{-1}*2\pi*(y-i_{close})*\alpha(k)/L)$ if the $\beta(k)$ is less than a predetermined factor; and
   normalizing the beamforming weighting vector for the downlink subcarrier $U_y$ according to the following equation:

$$U_y = \frac{\text{conjugate}(U_y)}{\text{norm}(U_y)},$$

where conjugate(.) is the conjugate operator and the norm(.) is the Euclidean norm operator.

17. The method of claim 16, and further comprising selecting the predetermined factor based on the received signal-to-noise ratio (SNR) of received signals at each antenna.

18. The method of claim 17, wherein the predetermined factor equals to $$\frac{2}{3}J$$

if the SNR of each antenna is $\leq 0$ dB, where J is the number of tiles of the one or more sub-channels.

19. The method of claim 17, wherein the predetermined factor is infinity if SNR of each antenna is >0 dB.

20. The method of claim 15, wherein computing the beamforming weighting vector further comprises:
   initializing a beamforming weighting vector for a downlink subcarrier $U_y$ according to the following equation: $U_y=\text{abs}(\overline{U}_{j_{max}})*\exp(\sqrt{-1}*\text{angle}(U_{i_{close},j_{max}}))$, where abs(.) is the absolute value operator and $U_{i_{close},j_{max}}$ is a beamforming weighting vector for an uplink subcarrier $i_{close}$ of the DOA sub-sector $j_{max}$ and $i_{close}$ is the index of a subcarrier whose frequency is closest to that of subcarrier y;
   updating the beamforming weighting vector for the downlink subcarrier $U_y$ by taking into account all DOA sub-sectors according to the following equation: $U_y=U_y+\text{abs}(\overline{U}_{j_k})*\exp(\sqrt{-1}*\text{angle}(U_{i_{close},j_k}\exp(\sqrt{-1}*2\pi(y-i_{close})\alpha(k)/L)))$ if the $\beta(k)$ is less than a predetermined factor; and
   normalizing the beamforming weighting vector for the downlink subcarrier $U_y$ in according with the following equation:

$$U_y = \frac{\text{conjugate}(U_y)}{\text{norm}(U_y)},$$

where conjugate(.) is the conjugate operator and the norm(.) is the Euclidean norm operator.

21. A device comprising:
   a plurality of antennas configured to receive and transmit signals;
   a radio transceiver coupled to the plurality of antennas and configured to downconvert signals received by the plurality of antenna to produce baseband receive signals and configured to upconvert baseband transmit signals for transmission by the plurality of antennas;
   a processor coupled to the radio transceiver, wherein the processor is configured to generate downlink beamforming weighting vectors that are applied to the baseband transmit signals for transmission to a destination device, wherein the processor is configured to generate downlink weighting vectors by:
      calculating an average channel covariance matrix of one or more uplink sub-channels assigned to the destination device in a wireless communication network;
      dividing a sector of a cell in the wireless communication network into a plurality of sub-sectors;
      transforming the average channel covariance matrix into a plurality of average sub-sector channel covariance matrices and computing therefrom an average uplink beamforming weighting vector group corresponding to the plurality of sub-sectors;
      selecting direction of arrival (DOA) sub-sectors from the plurality of sub-sectors using the plurality of average sub-sector channel covariance matrices;
      computing a time delay sequence for the DOA sub-sectors; and
      generating downlink beamforming weighting vectors using the average uplink beamforming weighting vectors corresponding to the DOA sub-sectors and information derived from the time delay sequence.

22. The device of claim 21, wherein the processor is configured to compute the average channel covariance matrix by:
   computing instantaneous channel covariance matrices of a plurality of subcarriers of the one or more uplink sub-channels comprising a plurality of tiles, each of which includes a plurality of subcarriers over more than one time instance;
   generating channel covariance matrices of the plurality of subcarriers from the instantaneous channel covariance matrices; and
   obtaining the average channel covariance matrix of the one or more sub-channels assigned to the mobile device from channel covariance matrices of the plurality of subcarriers.

23. The device of claim 22, wherein the processor is configured to generate a channel covariance matrix of subcarrier i in tile n, denoted as $\hat{R}_{i_n}$, is based on either $\hat{R}_{i_n} = U_{i_n}(U_{i_n})^H$, $\hat{R}_{i_n} = |\lambda_{i_n}| U_{i_n}(U_{i_n})^H$, or $\hat{R}_{i_n} = |\lambda_{i_n}|^2 U_{i_n}(U_{i_n})^H$, where H is a Hermitian operator, wherein $U_{i_n}$ is a principle eigenvector and $\lambda_{i_n}$ a maximum eigenvalue of the instantaneous channel covariance matrix $R_{i_n}$.

24. The device of claim 22, wherein the processor is configured to compute the average channel covariance matrix by summing the channel covariance matrices of all tiles based on the following equation:

$$\bar{R} = \sum_{n=1}^{J} \hat{R}_{i_n},$$

where $\hat{R}_{i_n}$ is a channel covariance matrix of subcarrier i in tile n.

25. The device of claim 21, wherein the processor is configured to compute the average sub-sector channel covariance matrix $\bar{R}_z$, for sub-sector z based on the following equation: $\bar{R}_z = \bar{R} T_z$, where $T_z$ is a predetermined transformation matrix of sub-sector z; $1 \leq z \leq N_s$ where $N_s$ is the number of sub-sectors and $\bar{R}$ is the average channel covariance matrix.

26. The device of claim 21, wherein the processor is configured to compute the average uplink beamforming weighting vector group corresponding to the plurality of sub-sectors by computing $\{\bar{U}_1, \bar{U}_2, \ldots, \bar{U}_{N_s}\}$, where $\bar{U}_z$ is the first row vector of the average sub-sector channel covariance matrix $\bar{R}_z$.

* * * * *